United States Patent [19]
Perry et al.

[11] Patent Number: 5,629,810
[45] Date of Patent: May 13, 1997

[54] MIRROR ASSEMBLY FOR THE EXTERIOR OF AN AUTOMOTIVE VEHICLE HAVING A HAND SET MECHANISM

[75] Inventors: William M. Perry, Palestine; Kerry L. Helmer, Hollansburg, both of Ohio

[73] Assignee: United Technologies Automotive, Inc., Dearborn, Mich.

[21] Appl. No.: 384,384

[22] Filed: Feb. 3, 1995

Related U.S. Application Data

[63] Continuation of Ser. No. 61,618, May 12, 1993, abandoned.

[51] Int. Cl.$^6$ .................. G02B 5/08; G02B 7/182; B60R 1/06
[52] U.S. Cl. .................. 359/872; 359/875; 248/479; 248/483
[58] Field of Search .................. 359/872, 873, 359/874, 875, 876, 877; 248/477, 478, 479, 481, 483, 484

[56] References Cited

U.S. PATENT DOCUMENTS

| | | | |
|---|---|---|---|
| 2,452,316 | 10/1948 | Morley | 248/483 |
| 4,401,289 | 8/1983 | Fisher et al. | 248/483 |
| 4,464,017 | 8/1984 | Wada . | |
| 4,555,166 | 11/1985 | Enomoto | 359/877 |
| 4,558,840 | 12/1985 | Manzoni | 248/484 |
| 4,636,045 | 1/1987 | Suzuki . | |
| 4,651,965 | 3/1987 | Vigna et al. | 359/875 |
| 4,693,571 | 9/1987 | Kimura et al. | 359/874 |
| 4,696,555 | 9/1987 | Enomoto . | |
| 4,824,065 | 4/1989 | Manzoni . | |
| 4,830,327 | 5/1989 | Fimeri . | |
| 4,856,886 | 8/1989 | Polzer et al. . | |
| 4,867,408 | 9/1989 | Ozaki | 248/483 |
| 4,981,279 | 1/1991 | Andreas et al. . | |
| 4,988,068 | 1/1991 | Yamana et al. | 359/875 |
| 4,998,814 | 3/1991 | Perry . | |
| 5,110,196 | 5/1992 | Lang et al. | 359/876 |

FOREIGN PATENT DOCUMENTS

| | | | |
|---|---|---|---|
| 0352762 | 1/1990 | European Pat. Off. . | |
| 2119772 | 8/1972 | France . | |
| 2334535 | 7/1977 | France . | |
| 2554066 | 5/1985 | France | 359/874 |
| 2219500 | 10/1973 | Germany | 248/483 |
| 648987 | 1/1951 | United Kingdom | 248/483 |

*Primary Examiner*—Ricky D. Shafer
*Attorney, Agent, or Firm*—Harness, Dickey & Pierce, P.L.C.

[57] ABSTRACT

An automotive exterior mirror assembly being comprised of a mirror which is held in place and adjusted through a hand set adjustment mechanism which, in turn, is fastened to a bracket; the bracket is attached to an aesthetically pleasing shell. The hand set adjustment mechanism is a low profile assembly, having all of its components mounted from one side. The components are a base, a pivot cup, a sleeve, a retainer, a spring, and a spring retainer. The hand set adjustment mechanism has a partially spherical base with a post centrally extending therefrom for compressibly mounting a pivot cup thereupon. The post extends between the inside of the base and the backside of the mirror casing.

16 Claims, 3 Drawing Sheets

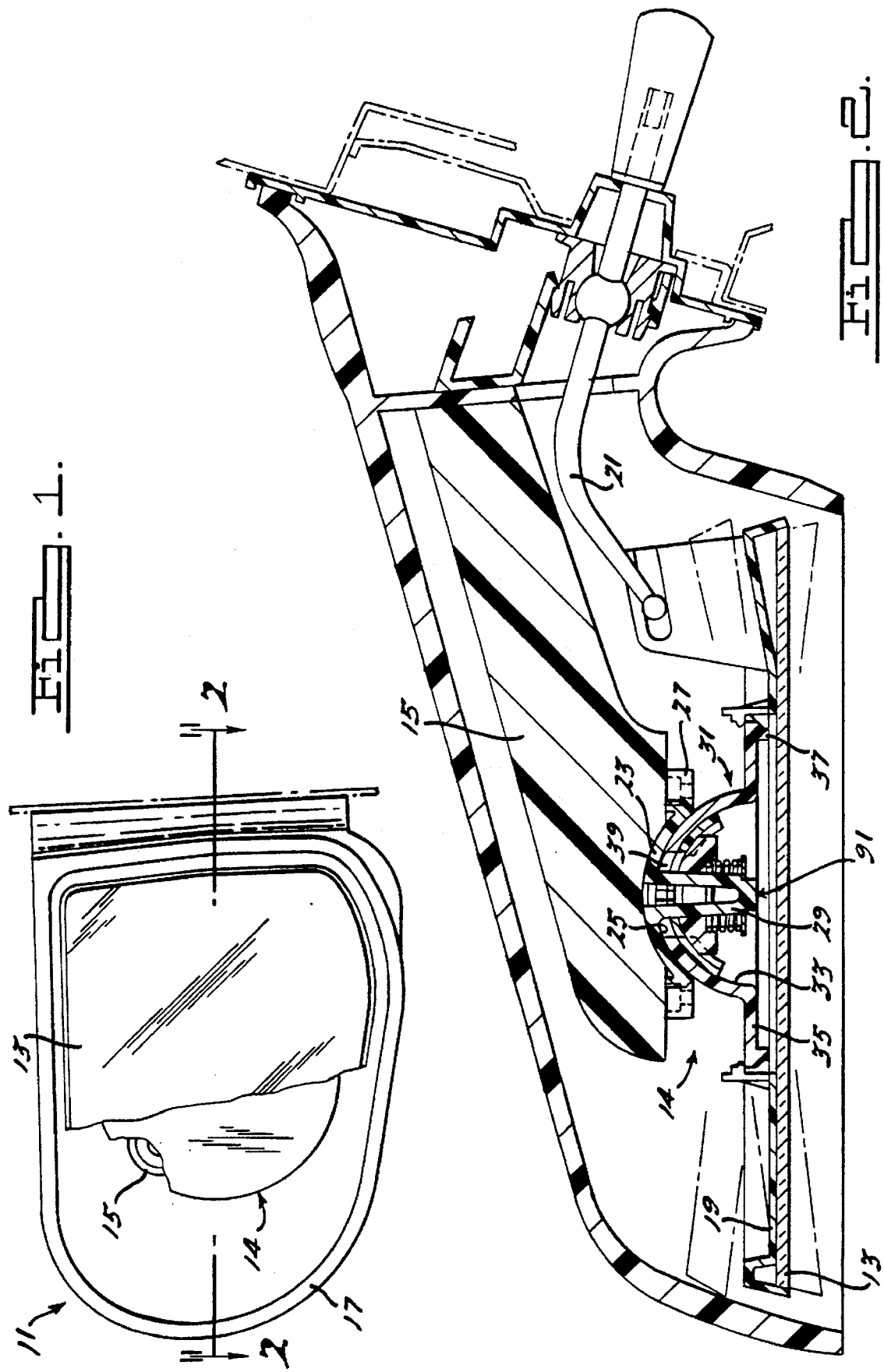

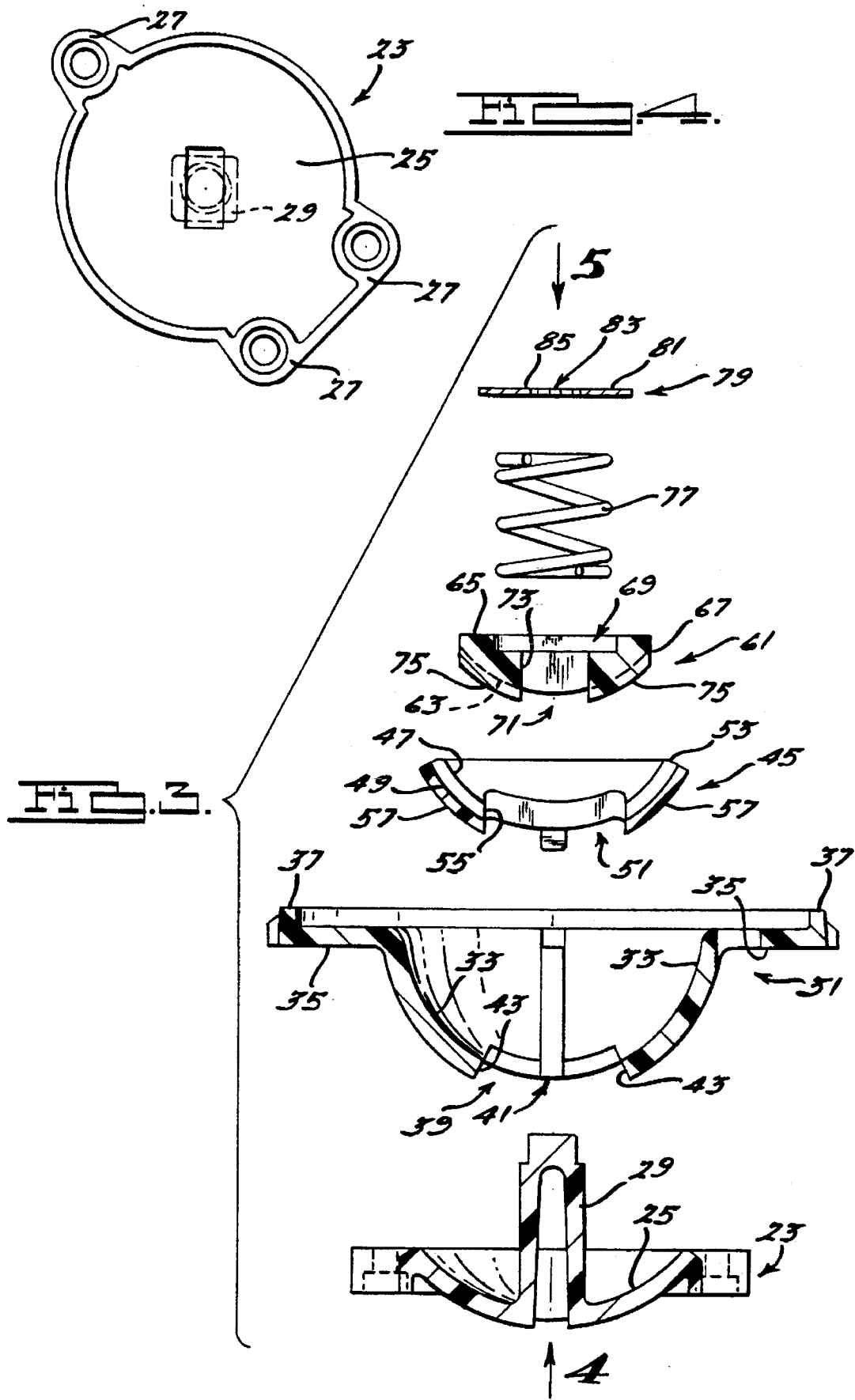

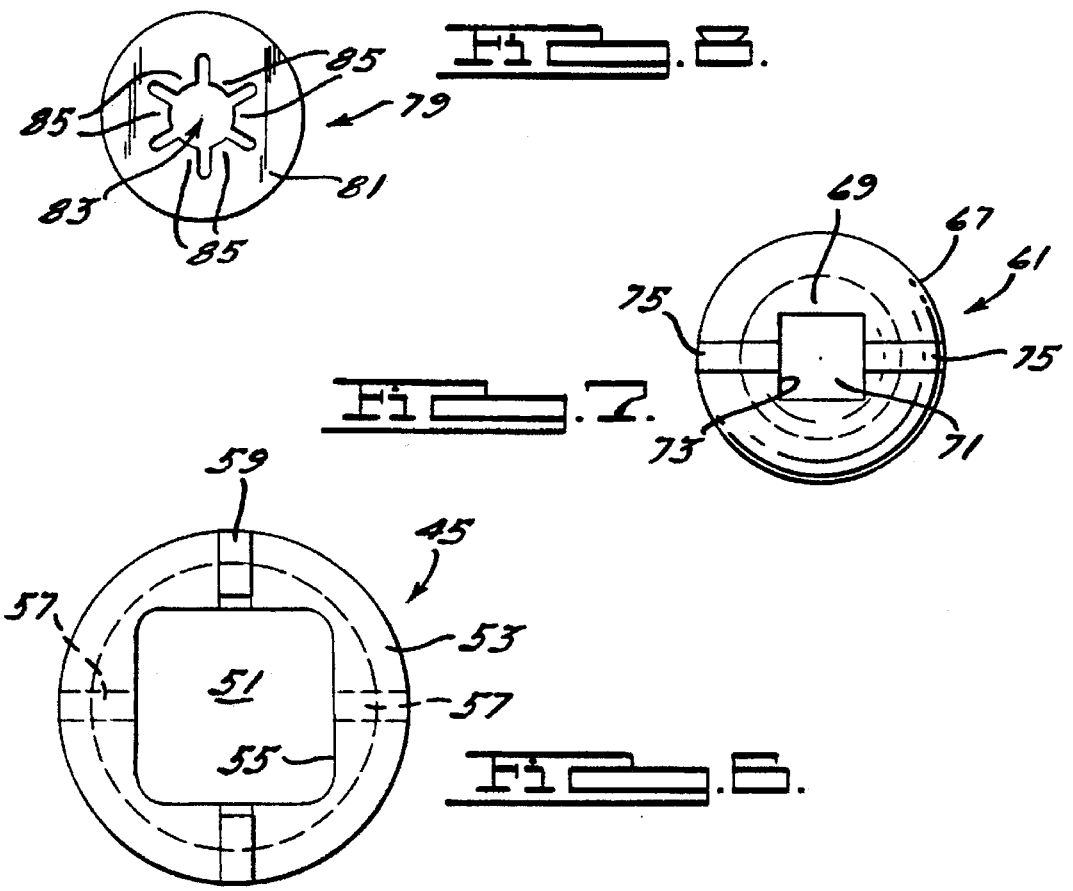
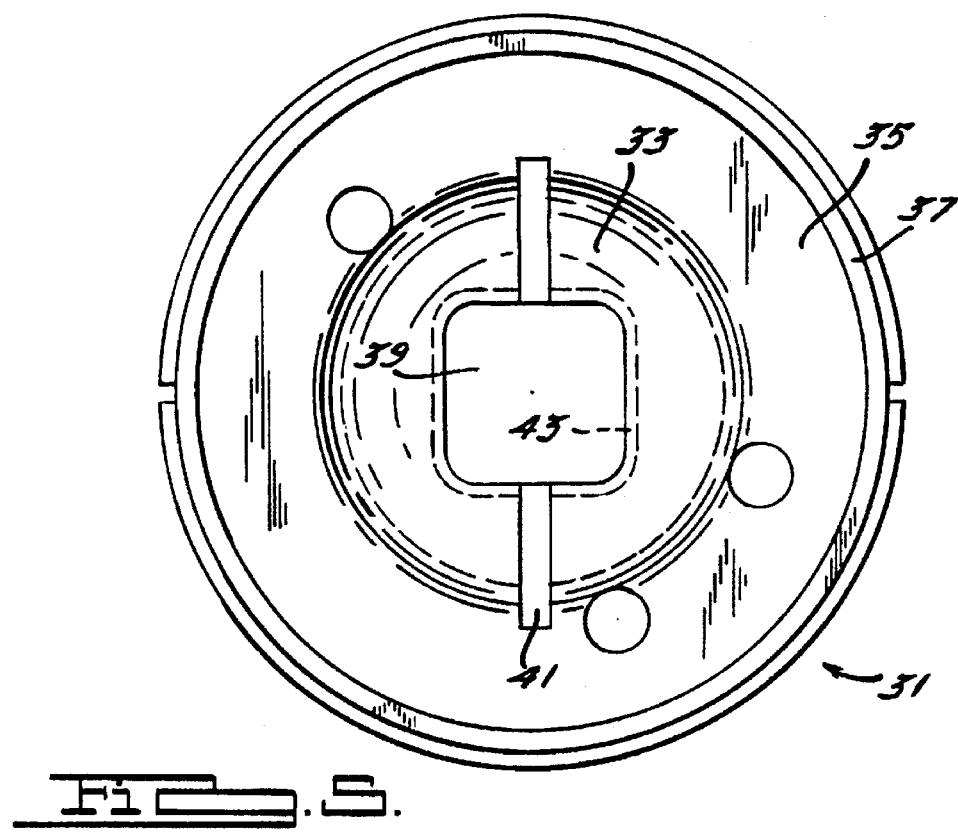

MIRROR ASSEMBLY FOR THE EXTERIOR OF AN AUTOMOTIVE VEHICLE HAVING A HAND SET MECHANISM

This is a continuation division of U.S. patent application Ser. No. 08/061,618, filed May 12, 1993, now abandoned.

BACKGROUND OF THE INVENTION

This invention relates generally to exterior mirror assemblies for automotive vehicles and specifically to exterior mirror assemblies having a hand set mirror adjustment mechanism therein.

In exterior mirror assemblies for automobiles, it is common to have a housing with an internal adjustment mechanism which supports and moves a mirror. The manual or hand set version often utilizes levers or cables for remote adjustment of the mirror within the housing. However, traditional manually adjusted mirrors for the exterior of automotive vehicles have had optical vibration problems. A common adjustment mechanism design has been to use a pair of ball and socket or cylindrical post frictional retention means. Examples of this are: U.S. Pat. No. 4,856,886, "Outside Rear-View Mirror Having A Mechanically Adjustable Mirror Glass For A Vehicle", issued to Polzer et al. on Aug. 15, 1989; U.S. Pat. No. 4,830,327, "Rear Vision Mirror Adjusting Means", issued to Fimer on May 16, 1988; and, U.S. Pat. No. 4,636,045, "Manual Adjusting Device For Tiltable Outer Mirror", issued to Suzukion on Jan. 13, 1987; all of which are incorporated by reference herewithin.

Another method has been to use a pivot cup, attached to a mirror casing, wherein the pivot cup has a forward facing post centrally extending therefrom in a direction away from the mirror casing. The pivot cup post is held onto a retainer by a compression spring axially extending forward therefrom. This method is shown in U.S. Pat. No. 4,981,279, "Adjustable Rear View Mirror", issued to Andreas et al. on Jan. 1, 1991 and assigned to the assignee of the present invention (Sheller-Globe Corp. was subsequently acquired by the present assignee); this patent is incorporated by reference herewithin. A third type of adjustment mechanism is described in U.S. Pat. No. 4,824,065, "Rear View Mirror for Various Vehicles Utilizing Friction Bearing Surface", issued to Manzoni on Apr. 25, 1989, incorporated by reference herewithin. The latter two adjustment mechanisms illustrate an improvement in the art over the prior ball and socket or cylindrical post mechanisms, however, these latter patents still have optical vibration problems and assembly may be intricate and difficult.

SUMMARY OF THE INVENTION

In accordance with the present invention, the preferred embodiment of a mirror assembly for the exterior of an automobile having a hand set adjustment mechanism is comprised of a partially spherical base with a concave surface thereon having a post centrally extending therefrom for compressibly mounting a pivot cup thereupon. The post extends between the concave surface of the base and the backside of the mirror casing.

This invention allows for more efficient assembly than the prior art since the compression means and pivot cup can be installed onto the base from one direction as compared to the prior art where parts are assembled onto each side of the pivot cup. Furthermore, the present invention reduces the optical distortion caused by vehicle vibration since the mirror pivot point is proximate with the back surface of the mirror casing. Moreover, the present invention is thinner than the prior art compression spring adjustment mechanism designs.

Additional advantages and features of the present invention will become apparent from the following description and appended claims, taken in conjunction with the accompanying drawings.

BRIEF DESCRIPTION OF THE DRAWINGS

FIG. 1 is a rear elevation view showing an automotive exterior mirror assembly with the preferred embodiment of the present invention hand set adjustment mechanism;

FIG. 2 is a horizontal sectional view showing the exterior mirror assembly with the present invention hand set adjustment mechanism, taken along line 2—2 in FIG. 1;

FIG. 3 is an exploded sectional view of the present invention hand set adjustment mechanism of FIGS. 1 and 2;

FIG. 4 is an elevation view of the base of the present invention hand set adjustment mechanism as viewed in the direction of arrow 4 of FIG. 3;

FIG. 5 is an elevation view of the pivot cup of the present invention hand set adjustment mechanism as viewed in the direction of arrow 5 of FIG. 3;

FIG. 6 is an elevation view of the sleeve of the present invention hand set adjustment mechanism as viewed in the direction of arrow 5 of FIG. 3;

FIG. 7 is an elevation view of the retainer of the present invention hand set adjustment mechanism as viewed in the direction of arrow 5 of FIG. 3; and FIG. 8 is an elevation view of the spring retainer of the present invention hand set adjustment mechanism as viewed in the direction of arrow 5 of FIG. 3.

DETAILED DESCRIPTION OF THE PREFERRED EMBODIMENT

In accordance with the present invention, a mirror assembly 11 for the exterior of an automotive vehicle comprises a mirror 13 which is secured by a hand set adjustment mechanism 14 which, in turn, is fastened to a bracket 15; bracket 15 is attached to an aesthetically pleasing shell 17. This can best be observed in FIGS. 1 and 2. Hand set adjustment mechanism 14 is a low profile assembly, having all of its components mounted from one side and is remotely operated by movement of a rod 21. The components of adjustment mechanism 14 are base 23, pivot cup 31, sleeve 45, retainer 61, spring 77, and spring retainer 79.

Referring to FIGS. 2–4, base 23 has a partially spherical center portion 25 which is peripherally bordered by three mounting flanges 27 for attachment to bracket 15. A series of structural ribs (not shown) located on the convex side improves the vibrational characteristics of the part. A hollow post 29 extends upward from the center of the concave side of spherical center portion 25. Base 23 remains stationary when mirror 13 is pivotally moved.

As can best be seen in FIGS. 2, 3, and 5, pivot cup 31 is mounted adjacent to the concave side of spherical center portion 25 of base 23. Pivot cup 31 has a semi-spherical center portion 33 circumferentially bordered by a generally flat surface 35 extending outward therefrom. Flat surface 35 is further peripherally bordered by an upturned wall 37 located thereupon. Mirror casing 19, upon which mirror 13 is adhesively bonded, is snap fit onto the pivot cup's flat surface 35. Semi-spherical center portion 33 has an opening centrally located therein such that post 29 extends upward therethrough. Pivot cup opening 39 is generally square-shaped with rounded corners. Thus, the inside edges of opening 43 act to limit the X and Y axis travel of pivot cup 31. Semi-spherical center portion 33 has a pair of channels 41 longitudinally cut thereacross. These channels 41 extend from flat surface 35 to inside edge 43 of opening 39. As can be observed in FIG. 2, mirror casing 19 has a nominal planar surface referenced as number 101 while bracket 15 has a nominal planar surface referenced as number 103 located closest to the mirror casing.

Referring to FIGS. 2, 3, and 6, sleeve 45 is adjacent to the concave side of semi-spherical center portion 33 of pivot cup 31. Sleeve 45 has a semi-spherical inside surface 47 and a matching semi-spherical outside surface 57, both of which are bordered by an outside peripheral edge 53. Sleeve 45 has a central aperture 51 therein which is generally square shaped with rounded coners. Outside surface 57 has a pair of ribs 59 protruding therefrom; these ribs 59 extend from peripheral edge 53 to an inside edge 55 of aperture 51. Ribs 59 act cooperatively with channels 41 contained within pivot cup 31 to maintain directional pivoting alignment along one of the axes. Inside surface 47 of sleeve 45 has a pair of grooves 49 located therein. Grooves 49 extend from peripheral edge 53 to inside edge 55 of aperture 51. These grooves 49 run in a direction perpendicular to ribs 59 on the opposite surface of the part. Sleeve 45 remains stationary when mirror 13 and pivot cup 31 are pivotally moved in one direction, however, sleeve 45 moves with pivot cup 31 when mirror 13 is moved in a direction perpendicular thereto.

Referring to FIGS. 2, 3, and 7, a retainer 61 is compressibly mounted upon sleeve 45. Retainer 61 has a partially spherical lower surface 63 and a generally flat upper surface 65. A circular depression 69 is centrally located within upper surface 65. Retainer 61 has a generally square-shaped orifice 71 centrally located therethrough to provide a snug fit upon post 29. A pair of ribs 75 protrude from lower surface 63 and extends from peripheral edge 67 to inside edge 73 of orifice 71. Ribs 75 correspond to grooves 49 in sleeve 45 for maintaining pivoting directional alignment in a second axial direction. Retainer 61 is stationary while pivot cup 31 is being pivotally moved. Base 23, pivot cup 31, sleeve 45, and retainer 61, are Nylon 6/6 such as Monsanto Vydyne R400G.

As can best be observed in FIG. 3, a compression spring 77 is partially located within central depression 69 of retainer 61. Compression spring 77 supplies the compressive force against retainer 61 which in turn, forces sleeve 45 frictionally against spherical center portion 33 of pivot cup 31. Thus, pivot cup 31 is frictionally trapped between sleeve 45 and spherical center portion 25 of base 23.

Spring 77 is held in place by a spring retainer 79 as is illustrated in FIGS. 2, 3, and 8. The spring steel spring retainer 79 has a generally flat circular outer shape 81 with a void 83 centrally located therein. Outer shape 81 has inwardly projecting fingers 85 which serve to grab the end of post 29. Spring retainer 79 is preferably a palnut trade number PD219385.

In general, the weight of a glass mirror extending outward from a traditional adjustment mechanism pivot point creates a substantial moment arm. Gravitational forces and the automotive vehicle's vibrational movement act on this moment arm to produce optical distortion of the mirror. An advantage of the present invention is that pivot cup 31 has an outside spherical radius of approximately 22 millimeters thereby placing pivot point 91 of adjustment mechanism 14 proximate to the backside of the mirror casing 19. This minimizes the moment arm distance between the pivot point 91 and mirror 13 thereby increasing the natural vibrational frequency of hand set adjustment mechanism 14 which accordingly reduces the optical distortion of mirror 13. The natural frequency of adjustment mechanism 14, mirror casing 19, and mirror 13 can be measured using a Bruel & Kjaer 2034 FFT analyzer. This is linked to an Unholtz Dickie shaker and amplifier system set to an acceleration level near 0.5 g; an accelerometer, mounted on the outer surface of mirror 13, is used to measure the natural frequency spike. Using this testing procedure, adjustment mechanism 14 of the preferred embodiment has a natural frequency of approximately 110 Hertz.

An additional advantage of the present invention is that mirror casing 19 can be disassembled from pivot cup 31 for servicing of the components. Furthermore, pivot cup 31, sleeve 45, retainer 61, spring 77, and spring retainer 79, can all be installed onto post 29 of base 23 from one direction; this will reduce the handling of components and make assembly much more efficient, thus saving money. Another advantage is that hand set adjustment mechanism 14 can be readily substituted for a motorized power pack since hand set adjustment mechanism 14 of the present invention has a thin packaging profile. Moreover, compression spring 77 is not directly exposed to water or dirt that may enter mirror shell 17 since compression spring 77 is located between base 23 and the backside of mirror casing 19.

While the preferred embodiment of this hand set adjustment mechanism has been disclosed, it will be appreciated that various modifications may be made without departing from the present invention. For example the retainer, sleeve and pivot cup may not require a groove and rib alignment means. Furthermore, while a specific spring retainer has been described, a spring retainer of a different design used in a similar manner without departing from this invention. Moreover, while a glass mirror is preferred, a plastic mirror may also be used. Various materials have been disclosed in an exemplary fashion, however, various other materials may of course be employed. It is intended by the following claims to cover these and any other departures from the disclosed embodiments which fall within the true spirit of this invention.

The invention claimed is:

1. A mirror assembly for the exterior of an automobile having a hand set adjustment mechanism, said mirror assembly comprising:

a mirror, a mirror casing supporting said mirror, a base having a partially spherical center portion with a concave surface, said concave surface having an upwardly extending post, said base having outwardly extending mounting flanges defining a substantially nominal planar surface located closest to said mirror casing, said partially spherical center portion being depressed below said nominal planar surface away from said mirror casing, a mounting bracket contacting against said mounting flanges, a pivot cup having a central semi-spherical portion, said semi-circular portion being circumferentially bordered by a generally flat surface outwardly extending therefrom attached to said mirror casing, said semi-spherical portion having an centrally located opening through which said post extends, said semi-spherical portion being located adjacent to said concave surface of said base and being at least partially disposed below said nominal planar surface of said base away from said mirror casing, a sleeve being of a semi-spherical shape with an aperture through which said post extends, said sleeve having an outside and an inside surface, said outside surface being located against said semi-circular portion of said pivot cup, and means for forcibly compressing said pivot cup against said partially spherical portion of said base; whereby said pivot cup can pivotally move between said compression means and said partially spherical portion of said base.

2. The mirror assembly of claim 1 wherein said compressing means comprises:

a retainer compressibly mounted upon said sleeve, said retainer having a partially spherical lower surface circumferentially bordered by a peripheral edge thereupon, said retainer having an orifice centrally located therein through which said post extends, said retainer having an upper surface thereupon, said upper surface being substantially flat with a central depression therein, a compression spring located within the central depression of said retainer and around said post, a spring retainer forcibly located on top of said compression spring, said spring retainer being attached to said post of said base; and said spring retainer forcibly retaining said compression spring against said retainer, said retainer forcibly pushing said sleeve against said pivot cup, said pivot cup being compressibly located against said concave surface of said base, whereby said pivot cup can pivotally move between said sleeve and said base.

3. A mirror assembly for the exterior of an automobile having a hand set adjustment mechanism, said mirror assembly comprising:

a mirror, a mirror casing supporting said mirror, a base having a partially spherical center portion with a concave surface thereupon, said concave surface having a post extending upwardly therefrom, said base having mounting flanges outwardly extending therefrom, a pivot cup having a semi-spherical portion centrally located therewithin, said semi-circular portion being circumferentially bordered by a generally flat surface outwardly extending therefrom attached to said mirror casing, said semi-spherical portion having an opening centrally located therein through which said post extends, said semi-spherical portion being located adjacent to said concave surface of said base, a sleeve being of a semi-spherical shape with an aperture therein through which said post extends, said sleeve having an outside and an inside surface thereupon, said outside surface being located against said semi-circular portion of said pivot cup, a retainer compressibly mounted upon said sleeve, said retainer having a partially spherical lower surface circumferentially bordered by a peripheral edge thereupon, said retainer having an orifice centrally located therein through which said post extends, said retainer having an upper surface thereupon, said upper surface being substantially flat with a central depression therein, a compression spring located within the central depression of said retainer and around said post, a spring retainer forcibly located on top of said compression spring, said spring retainer being attached to said post of said base; and said spring retainer forcibly retaining said compression spring against said retainer, said retainer forcibly pushing said sleeve against said pivot cup, said pivot cup being compressibly located against said concave surface of said base, whereby said pivot cup can pivotally move between said sleeve and said base.

4. The mirror assembly of claim 3 wherein:

said spring retainer has a substantially flat outer shape with a centrally located void therein, said outer shape having inwardly projecting fingers therefrom.

5. A mirror assembly for the exterior of an automobile having a hand set adjustment mechanism, said mirror assembly comprising:

a base having a partially spherical center portion with a concave surface thereupon, said concave surface having a post extending upwardly therefrom, said base having mounting flanges outwardly extending therefrom, a mirror, a casing which locates and retains said mirror thereupon, a pivot cup having a semi-spherical portion centrally located therewithin, said semi-circular portion being circumferentially bordered by a generally flat surface outwardly extending therefrom, said flat surface being peripherally bordered by an upturned wall, said flat surface being attached to said mirror casing, said mirror casing being an independent member from said pivot cup, said semi-spherical portion having an opening centrally located therein through which said post extends, said opening being substantially square shaped with rounded corners and having an inside edge thereupon, said semi-spherical portion having a channel longitudinally cut therein extending from said flat portion to said inside edge of said opening, said semi-spherical portion being located adjacent to said concave surface of said base, a sleeve being of a semi-spherical shape with an aperture therein through which said post extends, said aperture within said sleeve being generally square-shaped with rounded corners, said sleeve having an outside and an inside surface thereupon, said outside surface having a rib mounted thereon, said rib extending from a peripheral edge of said sleeve to an inside edge of said aperture within said sleeve, said rib acting cooperatively with the channel of said pivot cup to maintain directional pivoting alignment, said inside surface of said sleeve having a groove therein extending from the outside edge to a second inside edge of said sleeve aperture, said groove being proximately perpendicular to said rib on said outside surface, said outside surface being located against said semi-circular portion of said pivot cup, a retainer compressibly mounted upon said sleeve, said retainer having a partially spherical lower surface circumferentially bordered by a peripheral edge thereupon, said retainer having a substantially square orifice centrally located therein through which said post extends, said lower surface having a second rib protruding therefrom, said second rib extending from said second peripheral edge to a third inside edge of said orifice, said second rib responding to said sleeve groove for pivoting directional alignment, said retainer having an upper surface thereupon, said upper surface being substantially flat with a central depression therein, a compression spring located within the central depression of said retainer and around said post, a spring retainer forcibly located on top of said compression spring, said spring retainer having a substantially flat outer shape with a centrally located void therein, said outer shape having inwardly projecting fingers therefrom for attachment to said post of said base; and said spring retainer forcibly retaining said compression spring against said retainer, said retainer forcibly pushing said sleeve against said pivot cup, said pivot cup being compressibly located against said concave surface of said base, whereby said base can pivotally move between said sleeve and said base.

6. A mirror assembly for the exterior of an automobile having a hand set adjustment mechanism, said mirror assembly comprising:

a base having a partially spherical center portion with a concave surface thereupon, said concave surface having a post extending upwardly therefrom, a pivot cup having a semi-spherical portion centrally located therewithin, said semi-circular portion being circumferentially bordered by a casing mounting surface outwardly extending therefrom, said semi-spherical portion having an opening centrally located therein through which said post extends, said semi-spherical portion being located adjacent to said concave surface of said base, said semi-spherical portion having a channel longitudinally cut therein extending from said casing mounting surface to said inside edge of said opening, a sleeve being of a semi-spherical shape with an aperture therein through which said post extends, said sleeve having an outside and an inside surface thereupon, said outside surface being located against said semi-circular portion of said pivot cup, said outside surface having a rib mounted thereon, said rib extending from a peripheral edge of said sleeve to an inside edge of said aperture within said sleeve, said rib acting cooperatively with the channel of said pivot cup to maintain directional pivoting alignment, a retainer compressibly mounted upon said sleeve, said retainer having a partially spherical lower surface circumferentially bordered by a peripheral edge thereupon, said retainer having an orifice centrally located therein through which said post extends, said retainer having an upper surface thereupon, said upper surface being substantially flat with a central depression therein, a compression spring located within the central depression of said retainer and around said post, a spring retainer forcibly located on top of said compression spring, said spring retainer being attached to said post of said base; and said spring retainer forcibly retaining said compression spring against said retainer, said retainer forcibly pushing said sleeve against said pivot cup, said pivot cup being compressibly located against said concave surface of said base, whereby said pivot cup can pivotally move between said sleeve and said base.

7. A mirror assembly for the exterior of an automobile having a hand set adjustment mechanism, said mirror assembly comprising:

a mirror, a mirror casing supporting said mirror, a pivot cup having a centrally located semi-spherical portion, said semi-circular portion being circumferentially bordered by an outwardly extending casing mounting surface attached to said mirror casing, said semi-spherical portion having a centrally located opening through which a post extends toward a nominal planar surface defined by said mirror casing, an elongated mechanical force transmitting member coupled to at least one element from the group of: said mirror casing and said pivot cup, for allowing remotely operated hand set movement thereof, a shell, and at least a majority portion of a bracket being substantially hidden within said shell, said bracket being fixed relative to said shell, a section of said semi-spherical portion of said pivot cup extending at least partially within a partial spherical cavity of said bracket at least when said pivot cup is tilted, said pivot cup, said mirror casing and said mirror being movable relative to said shell;

whereby said mirror casing is removable from said pivot cup without damage to said mirror casing and said pivot cup, said pivot cup is removable from said bracket without damage to said pivot cup and said bracket.

8. The mirror assembly of claim 7 further comprising:

a semi-spherically shaped sleeve having an aperture through which said post extends, said sleeve having an outside and an inside surface, said outside surface being located against said semi-circular portion of said pivot cup, a retainer being compressibly mounted upon said sleeve, said retainer having a partially spherical lower surface circumferentially bordered by a peripheral edge, said retainer having a centrally located orifice through which said post extends, said retainer having a substantially flat upper surface with a central depression, and a compression spring located within the central depression of said retainer and around said post.

9. The mirror assembly of claim 8 further comprising:

a spring retainer forcibly located on top of said compression spring, said spring retainer being attached to said post of said base; and said spring retainer forcibly retaining said compression spring against said retainer, said retainer forcibly pushing said sleeve against said pivot cup, said pivot cup being compressibly located against said concave surface of said base, whereby said pivot cup can pivotally move between said sleeve and said base.

10. A mirror assembly for the exterior of an automobile, said mirror assembly comprising:

a mirror, a mirror casing supporting said mirror, a base having a center portion with an upwardly extending post, said base having outwardly extending mounting flanges defining a substantially nominal planar surface located closest to said mirror casing, said center portion being depressed below said nominal planar surface away from said mirror casing, a pivot cup having a centrally located semi-spherical portion, said semi-circular portion being circumferentially bordered by an outwardly extending surface attached to said mirror casing, said semi-spherical portion having a centrally located opening through which said post extends, said semi-spherical portion being located adjacent to said center portion of said base and being at least partially disposed below said nominal planar surface of said base away from said mirror casing, a semi-spherically shaped sleeve having an aperture through which said post extends, said sleeve having an outside and an inside surface, said outside surface being located against said semi-circular portion of said pivot cup, and at least a majority of a biasing member being disposed between said pivot cup and said mirror casing.

11. The mirror assembly of claim 10 further comprising:

a retainer compressibly mounted upon said sleeve, said retainer having a partially spherical lower surface circumferentially bordered by a peripheral edge, said retainer having a centrally located orifice through which said post extends, said retainer having a substantially flat upper surface with a central depression, said biasing member includes a compression spring located within the central depression of said retainer and around said post, a spring retainer forcibly located on top of said compression spring, said spring retainer being attached to said post of said base; and said spring retainer forcibly retaining said compression spring against said retainer, said retainer forcibly pushing said sleeve against said pivot cup, said pivot cup being compressibly located against said center portion of said base, whereby said pivot cup can pivotally move between said sleeve and said base.

12. The mirror assembly of claim 10 further comprising an elongated mechanical force transmitting member having a passenger accessible handle coupled to a first end and having at least one element taken from the group of: said mirror casing and said pivot cup, coupled to the other end.

13. The mirror assembly of claim 10 wherein said mirror casing is snap fit to said outwardly extending surface of said pivot cup.

14. The mirror assembly of claim 10 wherein said mirror, mirror casing, base, pivot cup and sleeve have a vibrational natural frequency of at least 105 Hertz.

15. The mirror assembly of claim 14 wherein the vibrational natural frequency is between 105 Hertz and 125 Hertz.

16. A mirror assembly for the exterior of an automobile, said mirror assembly comprising:

a mirror, a mirror casing supporting said mirror, a base having a center portion with an upwardly extending post, said base having outwardly extending mounting flanges defining a substantially nominal planar surface located closest to said mirror casing, said center portion being depressed below said nominal planar surface away from said mirror casing, a pivot cup having a centrally located semi-spherical portion, said semi-circular portion being circumferentially bordered by an outwardly extending surface attached to said mirror casing, said semi-spherical portion having a centrally located opening through which said post extends, said semi-spherical portion being located adjacent to said center portion of said base and being at least partially disposed below said nominal planar surface of said base away from said mirror casing, a semi-spherically shaped sleeve having an aperture through which said post extends, said sleeve having an outside and an inside surface, said outside surface being located against said semi-circular portion of said pivot cup, a majority of a biasing member being disposed between said pivot cup and said mirror casing; and an elongated mechanical force transmitting member having a passenger accessible handle coupled to a first end and having at least one element taken from the group of said mirror casing and said pivot cup, coupled to the other end.

* * * * *